(No Model.)
H. W. JAYNE.
MOLD FOR PLASTIC MATERIAL.
No. 422,221. Patented Feb. 25, 1890.
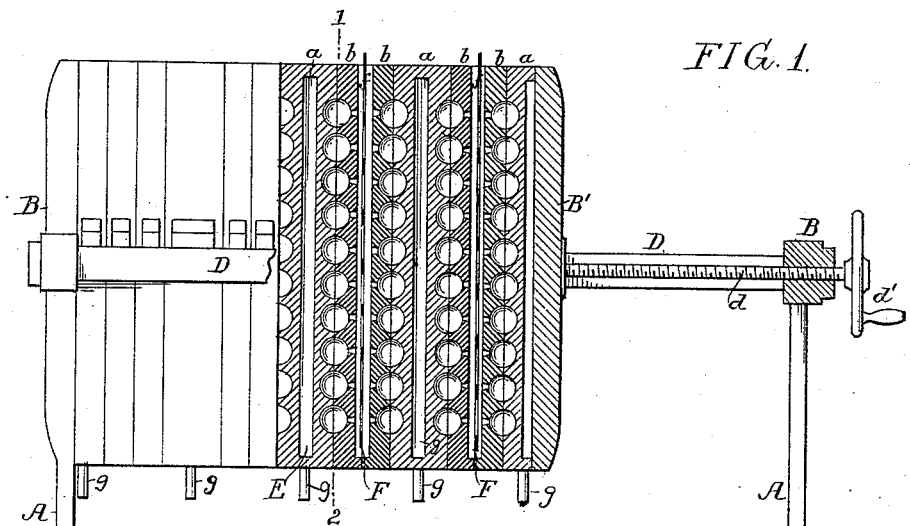
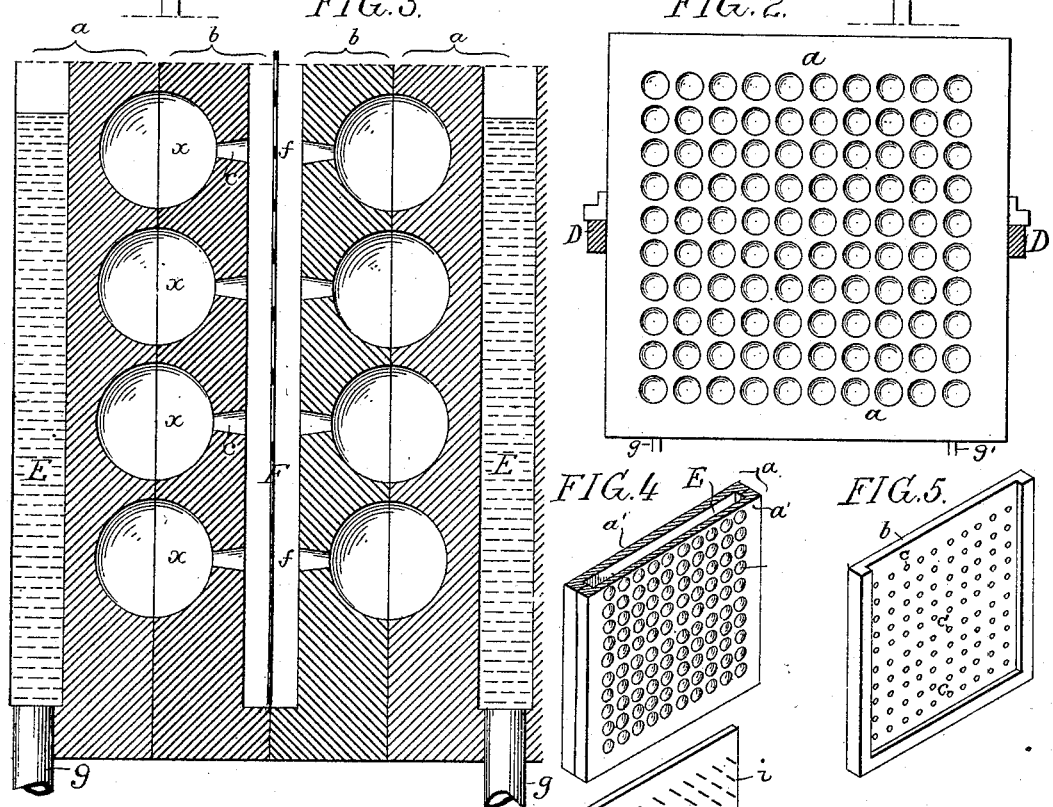
Witnesses:
Alex Barkoff
R. Schleicher
Inventor:
Harry W. Jayne
by his Attorneys
Howson & Howson

UNITED STATES PATENT OFFICE.

HARRY W. JAYNE, OF PHILADELPHIA, PENNSYLVANIA.

MOLD FOR PLASTIC MATERIAL.

SPECIFICATION forming part of Letters Patent No. 422,221, dated February 25, 1890.

Application filed November 11, 1889. Serial No. 329,879. (No model.)

*To all whom it may concern:*

Be it known that I, HARRY W. JAYNE, a citizen of the United States, and a resident of Philadelphia, Pennsylvania, have invented certain Improvements in Molds for Plastic Material, of which the following is a specification.

The object of my invention is to construct a mold in which are formed balls of material such as naphthaline.

In the accompanying drawings, Figure 1 is a side view, partly in section, of my improved mold. Fig. 2 is a transverse section on the line 1 2, Fig. 1. Fig. 3 is an enlarged sectional view of a portion of the mold. Fig. 4 is a perspective view of a cope-plate. Fig. 5 is a perspective view of the drag-plate, and Fig. 6 is a perspective view of the pin-plate.

A A are the standards, on which are mounted the heads B B, tied together by the longitudinal beams D. B forms one head of the mold, and B' the opposite head of the mold, and between these two plates are a series of mold-plates $a$ and $b$, supported on the longitudinal beams D, as shown clearly in Figs. 1 and 2, the whole being clamped together by a set-screw $d$, having at its outer end a hand-lever $d'$, so that when all the plates are in condition ready for pouring they are clamped together by this set-screw.

In forming the plates $a$, I make two castings $a'$ $a'$, as shown in Fig. 4, recessed at the back, forming when the two plates are placed back to back a water-space E for the purpose of keeping the molds cool. The faces of the plates $a'$ are cupped, as shown, to mold one half of the ball, the other half of the ball being formed in the plate $b$, as shown in Fig. 3. The rears of the plates $b$ are also recessed, as shown in Fig. 5, and connecting this recessed portion with the cupped face are a series of tapered channels $c$, to allow the material to be molded to flow into the several cavities $x$, formed by the two cupped faces of the plates $a$ and $b$.

A gauze or perforated sheet $f$ is placed in each pouring-cavity F, so that when the naphthaline, for instance, is poured into the mold it will flow through the gates or passages $c$ into the different chambers $x$ and around the sheet $f$, and when cool the plates $a$ and $b$ are released, and the block of material clinging to the sheet $f$ in the space F is removed, together with the portions projecting into the tapered channels $c$, these portions being severed from the balls at the neck. Owing to the cooling of the plate $a$ the balls will tend to adhere to the plate $b$, and to remove the balls from the plate $b$ a plate J is used, Fig. 6, having a series of pins $i$ the same distance apart as the openings or gates $c$ in the plate $b$, so that by inserting these pins into the openings the balls are forced into their seats in the plate.

Water is admitted to the space E through the pipe $g$, and the overflow passes out through the pipe $g'$. These pipes are connected to suitable reservoirs.

It will be understood that the cavities $x$ in the plate may be of other forms than spherical, depending altogether upon the shape required, and other material than naphthaline may be molded.

I claim as my invention—

1. The combination, in a mold, of the supporting-frame, the hollow plate $a$, having molding-cavities in its face, with a plate $b$, having molding-cavities corresponding to the cavities in the plate $a$ and a recess at its back forming a pouring-space, with channels connecting the pouring-space with the cavities, substantially as specified.

2. In a mold, the combination of the two plates $a'$ $a'$, the faces of which are cupped with recesses at the backs of said plates, said plates when secured together forming a water-chamber with water inlets and outlets, substantially as specified.

3. The combination, in a mold, of the frame, the plates mounted on said frame, one of said plates having its faces cupped forming the molding-chamber, a water-chamber in one of said plates and a pouring-chamber in the other plate, the cup portions with the pouring-space, with a perforated sheet in said pouring-space, substantially as and for the purpose set forth.

4. The combination of a plate of a mold cupped on one surface with a series of gates or passages passing through the plate to the cupped surfaces, with a plate I, having a series of pins $i$, spaced to correspond with the gates or passages, substantially as and for the purpose set forth.

In testimony whereof I have signed my name to this specification in the presence of two subscribing witnesses.

HARRY W. JAYNE.

Witnesses:
 HENRY HOWSON,
 HARRY SMITH.